(12) United States Patent
Chau

(10) Patent No.: US 8,666,815 B1
(45) Date of Patent: Mar. 4, 2014

(54) NAVIGATION-BASED AD UNITS IN STREET VIEW

(75) Inventor: Stephen Chau, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 129 days.

(21) Appl. No.: 13/229,308

(22) Filed: Sep. 9, 2011

(51) Int. Cl.
*G06Q 10/00* (2012.01)

(52) U.S. Cl.
USPC ...................................................... 705/14.63

(58) Field of Classification Search
USPC ........................................................ 705/14.63
See application file for complete search history.

(56) References Cited

U.S. PATENT DOCUMENTS

| | | | |
|---|---|---|---|
| 2010/0138294 A1* | 6/2010 | Bussmann et al. | 705/14.49 |
| 2011/0288917 A1* | 11/2011 | Wanek et al. | 705/14.5 |
| 2012/0054035 A1* | 3/2012 | Nam et al. | 705/14.58 |

* cited by examiner

*Primary Examiner* — Naresh Vig
(74) *Attorney, Agent, or Firm* — Lerner, David, Littenberg, Krumholz & Mentlik, LLP

(57) ABSTRACT

Systems, methods, and computer storage mediums for directing a user to an image of an advertiser's geolocation are provided. An exemplary method includes retrieving a first image associated with a geolocation, where the geolocation is based on a user action. At least one advertising unit is also selected based on at least the geolocation associated with the first image. Each advertising unit includes at least one geolocation associated with an advertiser. At least one advertising unit is then placed on the first image. Finally, a second image is retrieved when a placed advertising unit is selected by the user. The second image is retrieved based on the geolocation associated with the placed advertising unit.

20 Claims, 9 Drawing Sheets

NAVIGATION-BASED AD UNITS IN STREET VIEW

BACKGROUND

Webpages commonly display advertisements provided by an advertiser. These advertisements are traditionally retrieved via a URL embedded in a webpage and displayed in a predefined position. Upon selecting an advertisement, a user is usually directed to a webpage determined by the advertiser. The advertiser is then charged based on either the user selecting the advertisement or the advertisement being included on a webpage.

BRIEF SUMMARY

Photographic images of geolocations often capture places of business. These images may be used to direct a user to an advertiser's physical location. To direct a user to an advertiser's location, advertising units can be retrieved and placed on the image based on a number of factors such as, for example, the geolocation corresponding to the photographic image. If an advertising unit is selected by a user, the user may be directed to an image of the advertiser's geolocation.

The embodiments described below include systems, methods, and computer storage mediums for directing a user to an image of an advertiser's geolocation. An exemplary method includes retrieving a first image associated with a geolocation where the geolocation is based on a user action. At least one advertising unit is also retrieved based on at least the geolocation associated with the first image. Each advertising unit includes at least one geolocation associated with an advertiser. At least one advertising unit is then placed on the first image. A second image is retrieved when a placed advertising unit is selected by the user. The second image is retrieved based on the geolocation associated with the placed advertising unit.

Further features and advantages of this invention described herein, as well as the structure and operation of various embodiments, are described in detail below with reference to the accompanying drawings.

BRIEF DESCRIPTION OF THE DRAWINGS/FIGURES

Embodiments are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

In the following detailed description, references to "one embodiment," "an embodiment," "an example embodiment," etc., indicate that the embodiment described may include a particular feature, structure, or characteristic. Every embodiment, however, may not necessarily include the particular feature, structure, or characteristic. Thus, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments described herein make reference to an "advertising unit." An "advertising unit" can include any type of advertisement that can be displayed on a computing device, such as a banner advertisement, a text-based advertisement, etc. "Advertising units" may incorporate directional information, logos, or other images as well as textual information and interactive elements.

The following detailed description refers to the accompanying drawings that illustrate exemplary embodiments. Other embodiments are possible, and modifications can be made to the embodiments within the spirit and scope of this description. Those skilled in the art with access to the teachings provided herein will recognize additional modifications, applications, and embodiments within the scope thereof and additional fields in which embodiments would be of significant utility. Therefore, the detailed description is not meant to limit the embodiments described below.

This Detailed Description is divided into sections. The first and second sections describe example system and method embodiments that may be used to direct a user to an image of an advertiser's geolocation. The third section describes exemplary interfaces that can be used to carry out the embodiments described herein. The fourth section describes an example computer system that may be used to implement the embodiments described herein.

Example System Embodiments

A. Map Server Embodiment

Figure 1A:
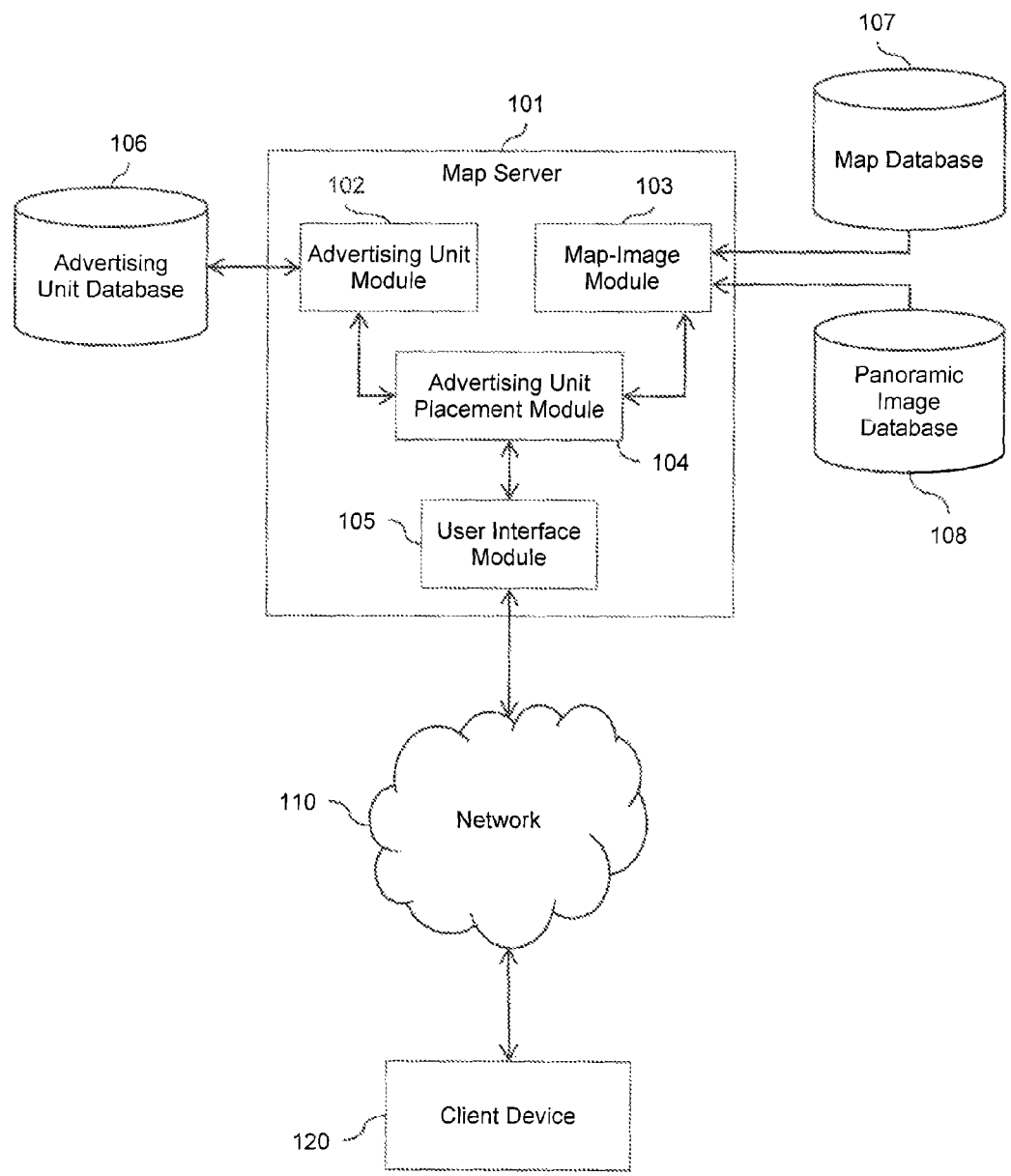
FIG. 1A is an example system environment that may be used to direct a user to an image of an advertiser's geolocation.

FIG. 1A is an example system environment 100A that may be used to direct a user to an image of an advertiser's geolocation. System 100A includes map server 101. Map server 101 includes advertising unit module 102, map-image module 103, advertising unit placement module 104, and user interface module 105. System 100A also includes advertising unit database 106, map database 107, panoramic image database 108, network 110, and client device 120.

Network 110 can include any network or combination of networks that can carry data communication. These networks can include, for example, a local area network (LAN) or a wide area network (WAN), such as the Internet. LAN and WAN networks can include any combination of wired (e.g., Ethernet) or wireless (e.g., Wi-Fi or 3G) network components.

Client device 120 can include any computing device capable of communicating with a geographic information system ("GIS") including, for example, stationary computing devices (e.g., desktop computers) and mobile computing devices such as, for example, tablets, smartphones, or other network enabled portable digital devices. Mobile computing devices may utilize Global Positioning System ("GPS") data, touch-screen interfaces, and location services to assist with retrieving and displaying geolocation images and advertising units. Map server 101, client device 120, advertising unit database 106, map database 107, and panoramic image database 108 also can run on any computing device. Each component may run on a distribution of computer devices or a single computer device. Examples of computing devices include, but are not limited to, a central processing unit, an application-specific integrated circuit, a computer, workstation, distributed computing system, computer cluster, embedded system, stand-alone electronic device, networked device, mobile device (e.g. mobile phone, smart phone, personal digital assistant (PDA), navigation device, tablet or mobile computing device), rack server, set-top box, or other type of computer system having at least one processor and memory. A computing process performed by a clustered computing environment or server farm may be carried out across multiple processors located at the same or different locations. Hardware can include, but is not limited to, a processor, memory and user interface display.

Map server 101 can be any GIS capable of capturing, storing, manipulating, analyzing, managing, and presenting geographically referenced data. Map server 101 includes advertising unit module 102, map-image module 103, advertising unit placement module 104, and user interface module 105. These modules, however, are not intended to limit the embodiments described herein. Consequently, one of skill in the art will readily understand how the functionality described herein may be implemented by using one or more alternative modules.

1. Map-Image Module

Map server 101 includes map-image module 103 that is configured to retrieve a first image associated with a geolocation, where the geolocation is determined based on a user action. The image can include either one image or a combination of images with fields of view up to and including 360 degrees. The image is associated with the geolocation of where the image was captured. The geolocation is then used to retrieve the image from a database, such as, for example, panoramic image database 108.

In some embodiments, the user action can include changes in the user's geolocation. For example, the user's geolocation can be determined based on GPS data collected from client device 120. Map-image module 103 can utilize this GPS data to retrieve an image that corresponds to the user's geolocation.

In some embodiments, the user action can include a touch-screen gesture. For example, the user may view an image of a first geolocation on a mobile device configured to accept touch gestures. The user can then navigate to a second geolocation via a touch gesture such as, for example, panning the image, whereby map-image module 103 will retrieve an image that corresponds to the second geolocation.

In some embodiments, the user action can include a user selection. For example, the user can select a point on a map that can be utilized by map-image module 103 to determine the geolocation. This example is described in more detail in reference to FIG. 3, herein. The user action can also include the user selecting a point within an image of a neighboring geolocation. This example is described in more detail in reference to FIGS. 4A, 4B, 5A and 5B, herein. In some embodiments, the user may select a URL link that navigates the user to a webpage that includes a map that references a geolocation or a photographic image of a geolocation.

Map-image module 103 is also configured to retrieve a second image when a placed advertising unit is selected by the user. The second image is retrieved based on a geolocation associated with the placed advertising unit. In some embodiments, the geolocation is determined by the advertiser. In other embodiments, the geolocation is determined by map server 101. Map server 101 may determine the geolocation by, for example, finding the advertiser's business location that is closest to the geolocation selected by the user. Combinations of these two embodiments may also be used.

Map-image module 103 may also be configured to retrieve a map or other geographically referenced data. This information may be acquired from a database such as, for example, map database 107. In one embodiment, map-image module 103 retrieves a map and additional data indicating the geolocations on the map that have corresponding photographic images. The map and additional data may be made available for display to a user via user interface module 105. The additional data is not limited to indicating which geolocations have corresponding photographic images, but may also include business locations, street names, addresses, traffic information, or other useful geographically referenced data.

2. Advertising Unit Module

Map server 101 also includes advertising unit module 102 that is configured to retrieve at least one advertising unit. The advertising units may be stored with a collection of advertising units in a database such as, for example, advertising unit database 106. An advertising unit may be retrieved based on several target factors such as, for example, the geolocation associated with an image or a geolocation included in each advertising unit. One or more geolocations associated with an advertiser can be included for each advertising unit.

The advertising units can also include a bid amount that can be based on various pricing models including, for example, cost-per-click (CPC) and cost-per-impression (CPM). A CPC pricing model charges the advertiser the bid amount each time a user selects an advertising unit associated with the advertiser. A CPM pricing model charges the advertiser the bid amount each time an advertising unit is displayed. Either pricing model, as well as other pricing models, may be used independently or in combination.

In some embodiments, one or more advertising units are retrieved based on the geolocation selected by a user. For example, if the user selects a geolocation from a map that corresponds to an intersection of two streets, advertising unit module 102 may retrieve one or more advertising units based on the geolocation of businesses located along both streets.

In some embodiments, advertising units are retrieved based one or more target factors. Target factors can be determined from information associated with a user such as, for example, a user profile. The user profile may store information such as, for example, previous searches conducted by the user, including search results, websites visited by the user, the approximate location of the user, and demographic information about the user. When the user chooses to view an image of a geolocation, advertising unit module 102 may utilize information in the user's profile to retrieve a targeted advertising unit. For example, if a user previously conducted a search for hotels around a geolocation, advertising unit module 102 may attempt to retrieve advertising units associated with hotel vendors having geolocations proximate to the selected geolocation. Other information associated with a user may be used in a similar fashion to retrieve advertising units.

In some embodiments, advertising units are retrieved based on one or more objects captured in the image of the geolocation. For example, if the user is viewing a hotel captured in the image, advertising units associated with other hotels can be retrieved. Similarly, if the user is viewing, a house or building for sale, advertising units corresponding to real estate agents can be retrieved.

In some embodiments, advertising units are retrieved based on a combination of one or more objects captured in the image and the physical location of the user. For example, if the user is viewing an image of a geolocation such as, for example, a landmark or tourist destination, that is a certain distance from the user's actual physical location, advertising units for hotels or other tourist related businesses can be retrieved. Alternatively, if the user's physical location is relatively close to the geolocation, advertising units targeted to local residents can be retrieved.

Target factors can also be determined from information associated with an advertiser such as, for example, a geographical range, a product or service category, key words, or target demographics. This information may be stored with each advertising unit or may be stored in an advertiser's profile. Advertising module 102 may then utilize this information to select one or more advertising units targeted to the user and/or the geolocation selected by the user. For example, if a user previously conducted a search for hotels at a location, advertising unit module 102 may locate advertising units from advertisers proximate to the selected geolocation that offer services to travelers. Other information associated with an advertiser may be used in a similar fashion to retrieve advertising units.

In some embodiments, advertising units may be retrieved based on the outcome of an auction. The auction may allow multiple advertisers to compete for advertising unit space on an image of a geolocation. The outcome of the auction may be based on information associated with the advertiser such as, for example, a geographical range, a product or service category, key words, or target advertising demographics. The outcome may also be based on, for example, the pricing model of the auction such as, for example, CPC or CPM, the price an advertiser is willing to pay, and/or the likelihood of a user selecting the advertising unit.

3. Advertising Unit Placement Module

Map server 101 further includes advertising unit placement module 104 that is configured to place one or more advertising units on an image. In some embodiments, advertising units are placed at positions toward the bottom of the image. In some embodiments, advertising units are placed based on performing an analysis of the image to determine an area on the image outside the user's area of interest. For example, advertising unit placement module 104 may analyze the pixels of the image to determine an image location that does not include an object assumed to be of interest to the user. For instance, if the image includes a building such as a landmark, advertising unit placement module 104 may analyze the image to determine a position for placing the advertisement that does not include the landmark.

To analyze the photographic image, advertising unit placement module 104 may utilize the pixels of the image and/or data included with the image. In some embodiments, data may be included with the image that describes the scene captured in the image. For example, the data may include a distance value for one or more pixels in the image that indicates the distance between an object captured in the image and the image capture device. This data can be utilized to determine objects in the image such as, for example, streets, sidewalks, the sky, and other areas that may not be of interest to the user.

In some embodiments, advertising unit placement module 104 will analyze the photographic image to locate pixels that represent the background of the photographic image. The background may include objects such as streets, sidewalks, and areas above or below a horizon line. These pixels may be located by comparing the color of each pixel with its neighboring pixels. Streets, for example, may be located by identifying large groups of similarly colored pixels positioned toward the bottom of the image. The areas above and below the horizon line, for example, may be located by first identifying the horizon line, then identifying the area above and below the horizon line. Horizon lines may be located by, for example, identifying a color change that occurs along an approximately straight line across the image. Other useful ways for locating objects in an image may also include the embodiments described in U.S. patent application Ser. No. 13/187,193, which is incorporated by reference herein in its entirety.

Advertising unit placement module 104 may also be configured to organize one or more selected advertising units based on a category. For example, multiple advertising units may be selected to be placed on an image. Each advertising unit may include a category that describes the products and services offered by an advertiser. Instead of placing each advertising unit separately, as described above, advertising unit placement module 104 may organize advertising units for similar products and/or services in a category and place a category object on the image. Categories are not intended to be limited to the products and service descriptions included by advertisers, but may also include factors such as, for example, an advertiser's distance from a selected geolocation.

4. User Interface Module

Map server 101 also includes user interface module 105. User interface module 105 is configured to display maps, geographically referenced data, and images of geolocations provided by map-image module 103, and advertising units provided by advertising unit module 102.

User interface module 105 may also be configured to allow a user to select geolocations from either a map or an image of a geolocation. Example embodiments are described with reference to FIGS. 3, 4A, 4B, 5A and 5B, herein.

User interface module 105 may also be configured to allow a user to select an advertising unit that is placed on an image of a geolocation. In some embodiments, when a user selects an advertising unit, user interface module 105 retrieves and displays an image of the geolocation associated with the advertising unit. This may be achieved by, for example, providing the geolocation associated with the selected advertising unit to map-image module 103. Map-image module 103 may then retrieve the image from map database 107.

In some embodiments, user interface module 105 navigates the user through a series of geolocation images captured along a path from the geolocation associated with the initial image to the geolocation associated with the advertising unit. This may be achieved by, for example, providing the initial image's geolocation and the geolocation associated with the advertising unit to map-image module 103. Map image module 103 may then determine a path between the two geolocations and retrieve one or more images along the path. These images may then be provided to user interface module 105 for display.

In some embodiments, user interface module 105 directs the user to information associated with the advertising unit. This may include, for example, navigating the user to an advertiser's landing webpage or another webpage designated by the advertising unit.

B. Client Device Embodiment

Figure 1B:
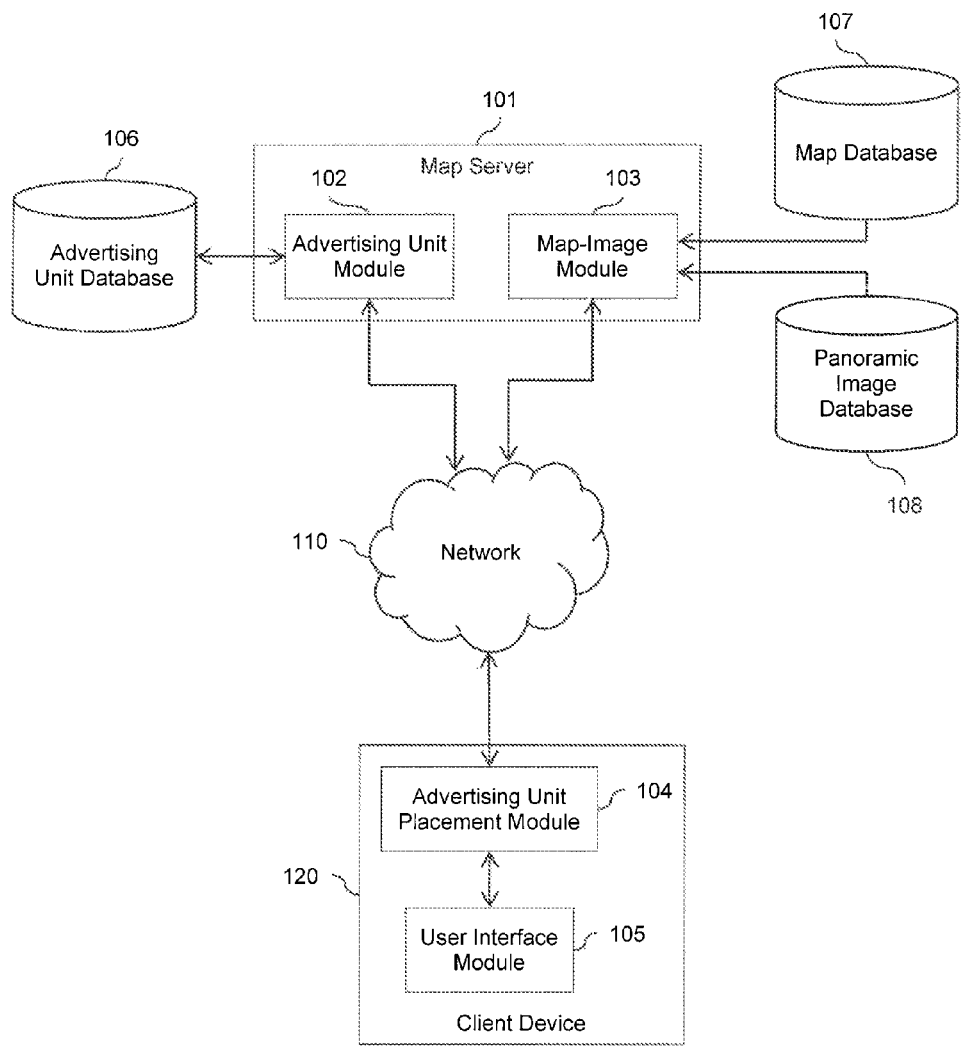
FIG. 1B is another example system environment that may be used to direct a user to an image of an advertiser's geolocation.

FIG. 1B is an example system environment 100B that may be used to direct a user to an image of an advertiser's geolocation. System 100B includes map server 101. Map server 101 includes advertising unit module 102 and map-image module 103. System 100B also includes advertising unit database 106, map database 107, panoramic image database 108, network 110, and client device 120. Client device 120 includes advertising unit placement module 104 and user interface module 105.

System 100B operates in a similar manner to system 100A, except that the functions of advertising unit placement module 104 and user interface module 105 are carried out by client device 120.

Advertising unit placement module 104 communicates with advertising unit module 102 and map-image module 103 via network 110. Advertising unit placement module 104 retrieves an image of a geolocation from map-image module 103. Advertising unit placement module 104 also retrieves one or more advertising units from advertising unit module 102. Advertising unit placement module 104 then determines where to place the one or more advertising units on the geolocation image using one of the placement techniques described above. The geolocation image and the one or more advertising units are then displayed using user interface module 105 with the advertising units displayed in the determined locations.

Various aspects of embodiments described herein can be implemented by software, firmware, hardware, or a combination thereof. The embodiments, or portions thereof, can also be implemented as computer-readable code. For example, advertising unit module 102, map-image module 103, advertising unit placement module 104, and user interface module 105 may be implemented in one or more computer systems or other processing systems. The embodiments in systems 100A and 100B are not intended to be limiting in any way.

Example Method Embodiments

Figure 2:
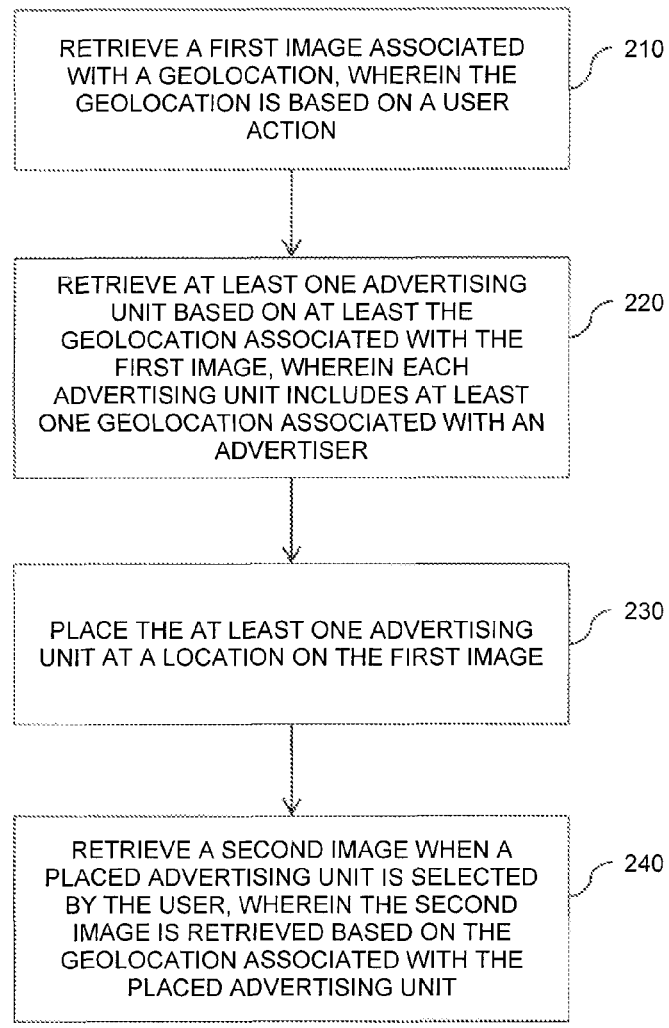
FIG. 2 is a flowchart illustrating an exemplary method that may be used to direct a user to an image of an advertiser's geolocation.

FIG. 2 is a flowchart illustrating an exemplary method 200 that may be used to direct a user to an image of an advertiser's geolocation. While method 200 is described with respect to one embodiment, method 200 is not meant to be limiting and may be used in other applications. Additionally, method 200 may be carried out by systems 100A or 100B, for example.

Method 200 retrieves a first image associated with a geolocation, where the geolocation is based on a user action (step 210). In some embodiments, the user selects a point on a map or selects a point in an image of a geolocation. In some embodiments, the user selects a URL link that navigates that user to a webpage that includes a map referencing a geolocation or a photographic image of a geolocation. In some embodiments, the geolocation is determined from GPS data retrieved from client device 120. Step 210 may be carried out by map-image module 103 embodied in systems 100A or 100B, for example.

Method 200 also selects at least one advertising unit based on at least the geolocation associated with the first image (step 220). Each advertising unit includes at least one geolocation associated with an advertiser. In some embodiments, the advertising units are retrieved based on the geolocation selected by the user, information associated with the user, information associated with the advertiser, and/or the outcome of an auction between advertisers. Step 220 may be carried out by advertising unit module 102 embodied in systems 100A or 100B, for example.

Method 200 then places the at least one advertising unit on the first image (step 230). Any technique for placing one image on another image may be used. These placement techniques are readily understood by a person of skill in the art. Step 230 may be carried out by advertising unit placement module 104 embodied in systems 100A and 10013, for example.

Finally, method 200 retrieves a second image when an placed advertising unit is selected by the user (step 240). The second image is retrieved based on the geolocation associated with the placed advertising unit. In some embodiments, the second image is displayed to the user via a user interface such as, for example, user interface module 105. Step 240 may be carried out by map-image module 103 embodied in systems 100A or 100B, for example.

Additional Example Embodiments

While system 100A embodied in FIG. 1A shows map server 101 including advertising unit module 102, map-image module 103, advertising unit placement module 104, and user interface module 105, map server 101 can include more or fewer modules. Similarly, while system 100B embodied in FIG. 1B shows map server 101 including advertising unit module 102 and map-image module 103, and client device 120 including advertising unit placement module 104 and user interface module 105, map server 101 and client device 120 can also include more or fewer modules. Additionally, map server 101 and client device 120 may each include a combination of the modules described above.

Below are example interfaces that may be used to implement the embodiments described with reference to systems 100A and 100B, and method 200.

A. Example Map Interface

Figure 3:
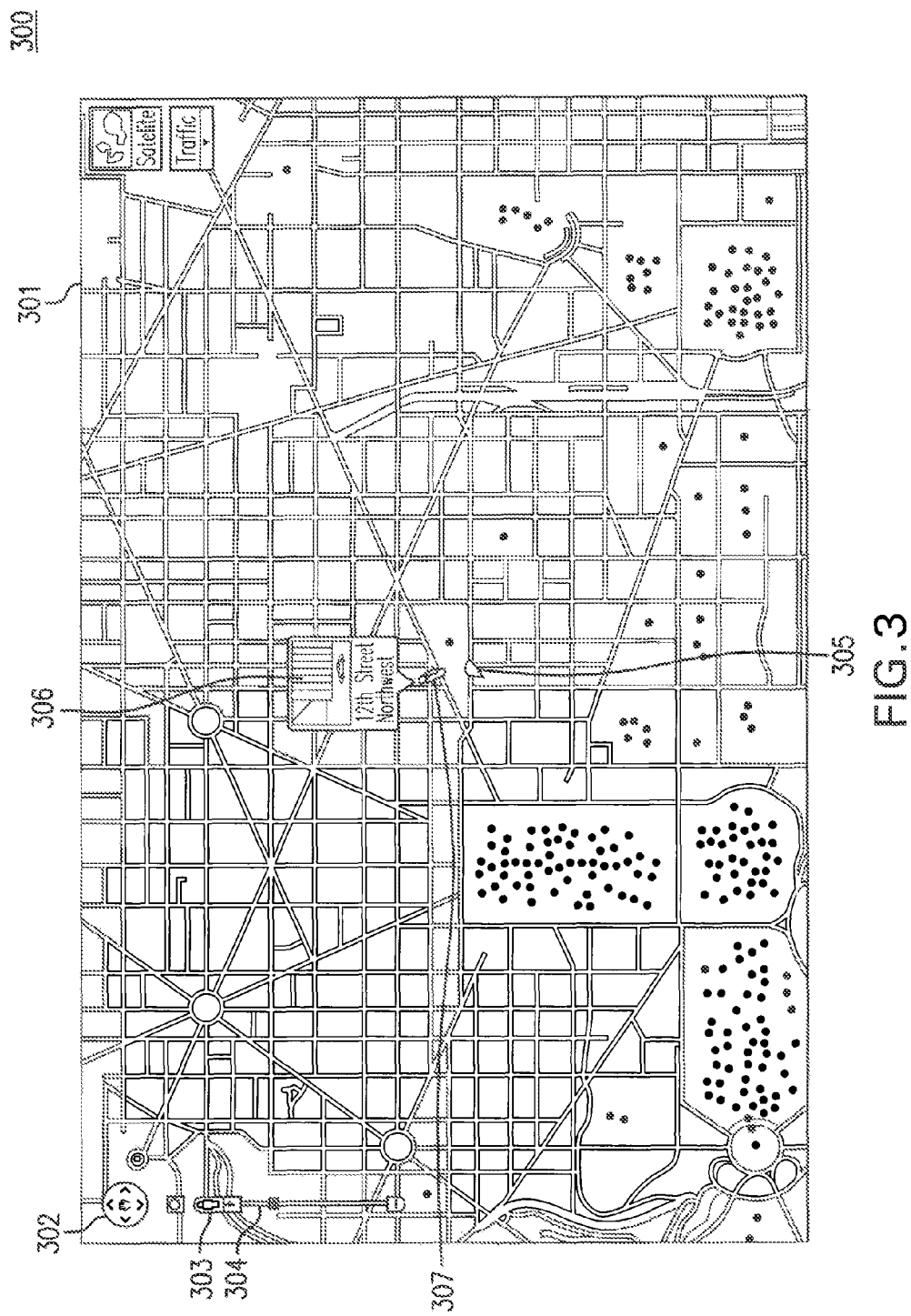
FIG. 3 is an example map interface that may be used to allow a user to select a geolocation, according to one embodiment.

FIG. 3 is an example map interface 300 that may be used to allow a user to select a geolocation, according to an embodiment. Map interface 300 includes map 301, compass 302, pegman selector 303, scale control 304, orientation indicator 305, preview 306, and pegman 307.

In some embodiments, map 301 is retrieved from map database 107 by map-image module 103. Once map-image module retrieves map 301, map 301 can be displayed to a user by user interface module 105 via advertising unit placement module 104. User interface module 105 may then add one or more interface elements to map 301 such as, for example, compass 302, pegman selector 303, scale control 304, orientation indicator 305, preview 306, and pegman 307.

Compass 302 may be used to either rotate map 301 to an alternate orientation or pan map 301. Pegman selector 303 may be used to select pegman 307 for placing onto map 301. Scale control 304 may be used to change the zoom factor of map 301. Orientation indicator 305 may be used to indicate the anticipated orientation of a image that will be displayed when pegman 307 is placed on map 301. Preview 306 may be used to show a thumbnail image of an image that corresponds to the geolocation indicated by pegman 307. Pegman 307 may be used to select a point on map 301 for which an image of a geolocation that corresponds to the selected point may be retrieved. The image may then be displayed in accordance with, for example, the embodiments in FIGS. 4A and 5A. Some or all of these interface elements may be included in one or more embodiments. Additionally, map interface 300 is not intended to limit the embodiments described herein.

B. Example Panoramic Interfaces

Figure 4A:
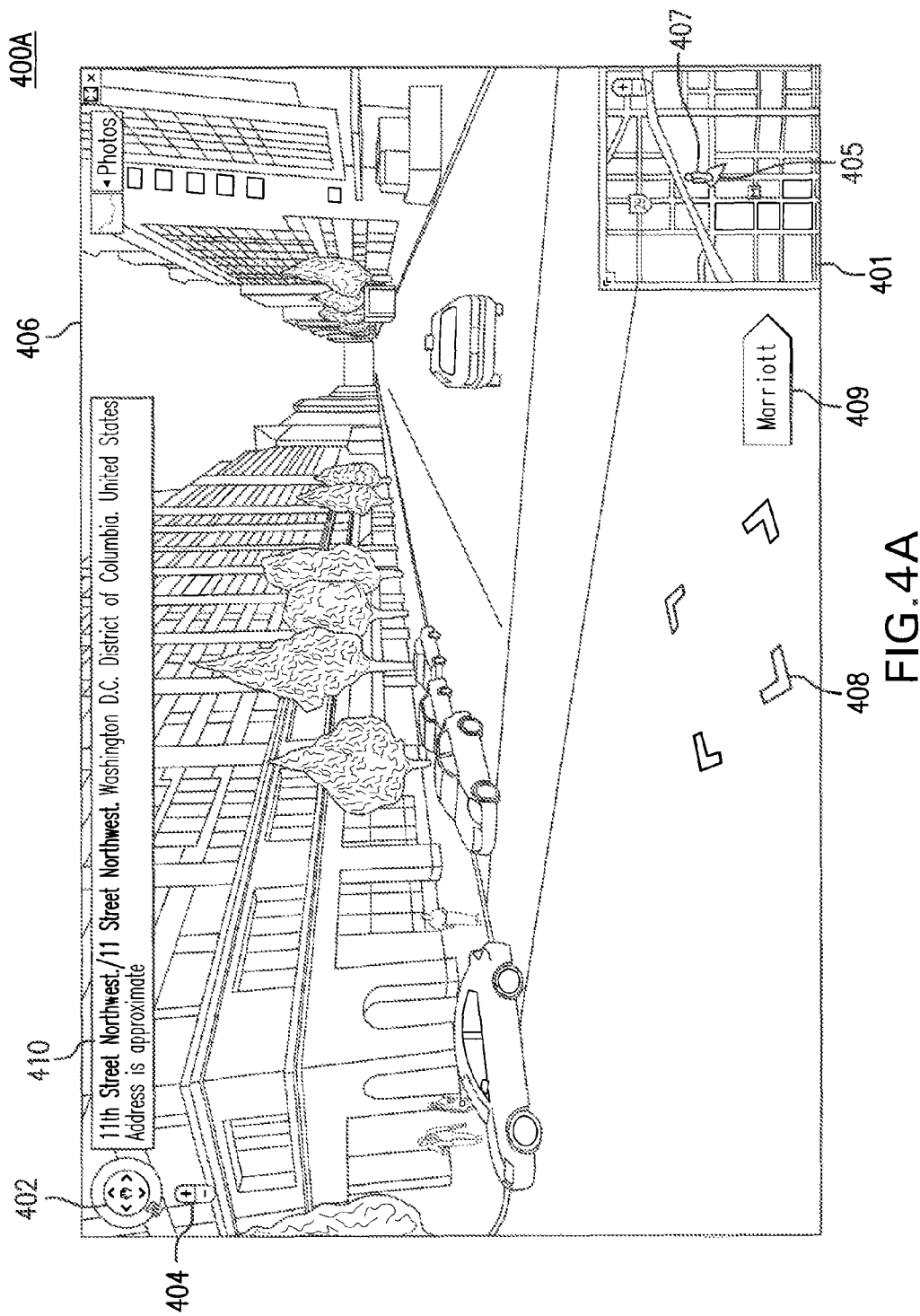
FIG. 4A is an example panoramic interface of a geolocation that includes an image and an example advertising unit that is placed on the image, according to one embodiment.

FIG. 4A is an example panoramic interface 400A for a geolocation that includes an image and an example advertising unit that is placed on the image, according to one embodiment. Panoramic interface 400A includes map 401, compass 402, image scale control 404, orientation indicator 405, panoramic image 406, pegman 407, navigation controls 408, advertising unit 409, and address indicator 410.

In some embodiments, panoramic image 406 is retrieved from panoramic image database 108 by map-image module 103. Panoramic image 406 is used to show the image corresponding to the geolocation selected by a user. In this example, panoramic image 406 is retrieved based on the user conducting a search for hotels in the Washington D.C. area and selecting to view the geolocation associated with one of the hotels appearing in the search results.

Once advertising unit 409 is selected from advertisement database 106 by advertisement module 102, advertising unit placement module 104 places advertising unit 409 onto panoramic image 406. Panoramic image 406 is then displayed to a user through user interface module 105 via advertising unit placement module 104. User interface module 105 may then add one or more interface elements to panoramic image 406 such as, for example, map 401, compass 402, scale control 404, orientation indicator 405, pegman 407, navigation controls 408, and address indicator 410.

Compass 402 may be used to either rotate map 401 to an alternate orientation or select a new geolocation. Scale control 404 may be used to change the zoom factor of panoramic image 406. Orientation indicator 405 may be used to indicate the current orientation of panoramic image 406. Pegman 407 may be used to indicate the geolocation on map 401 that corresponds to panoramic image 406. Navigation controls 408 may be used to navigate to a neighboring geolocation whereby an image of the neighboring geolocation will be retrieved and displayed. Address indicator 410 may be used to show the user the address, or an approximate address, of the selected geolocation.

Advertising unit 409 is an example advertising unit that provides an indication of where an advertiser associated with advertising unit 409 is generally located. For example, advertising unit 409 is shaped like an arrow and may be modified based on where the advertiser is located in relation to the geolocation of the image. In some embodiments, advertising unit 409 as well as other advertising units may be aligned along the bottom of panoramic image 406.

In this embodiment, advertising unit 409 was retrieved based on the advertiser including, with advertising unit 409, a keyword "hotel" and a geolocation range that encompassed the geolocation selected by the user. The retrieval was also based on the user's search results.

In some embodiments, however, advertising unit 409 may be selected by a user. If selected, the user will be directed to an image of the advertiser's geolocation. This may be achieved either by retrieving and displaying a new panoramic image of the advertiser's geolocation or by navigating the user along a path from the panoramic image 406 to a new panoramic image of the advertiser's geolocation.

Panoramic interface 400A may also include interface controls that allow a user to select points within panoramic image 406 to navigate through neighboring panoramic images. If a point within panoramic image 406 is selected, a panoramic image corresponding to the selected point may be displayed with a placed advertising unit. If the user navigates to a neighboring panoramic image, the neighboring image may be displayed with the same or a different advertising unit. Other interface controls may also be provided to assist with navigating through panoramic images.

Some or all of the interface elements and controls described herein may be included in one or more embodiments. Additionally, panoramic interface 400A is not intended to limit the embodiments described herein.

Figure 4B:
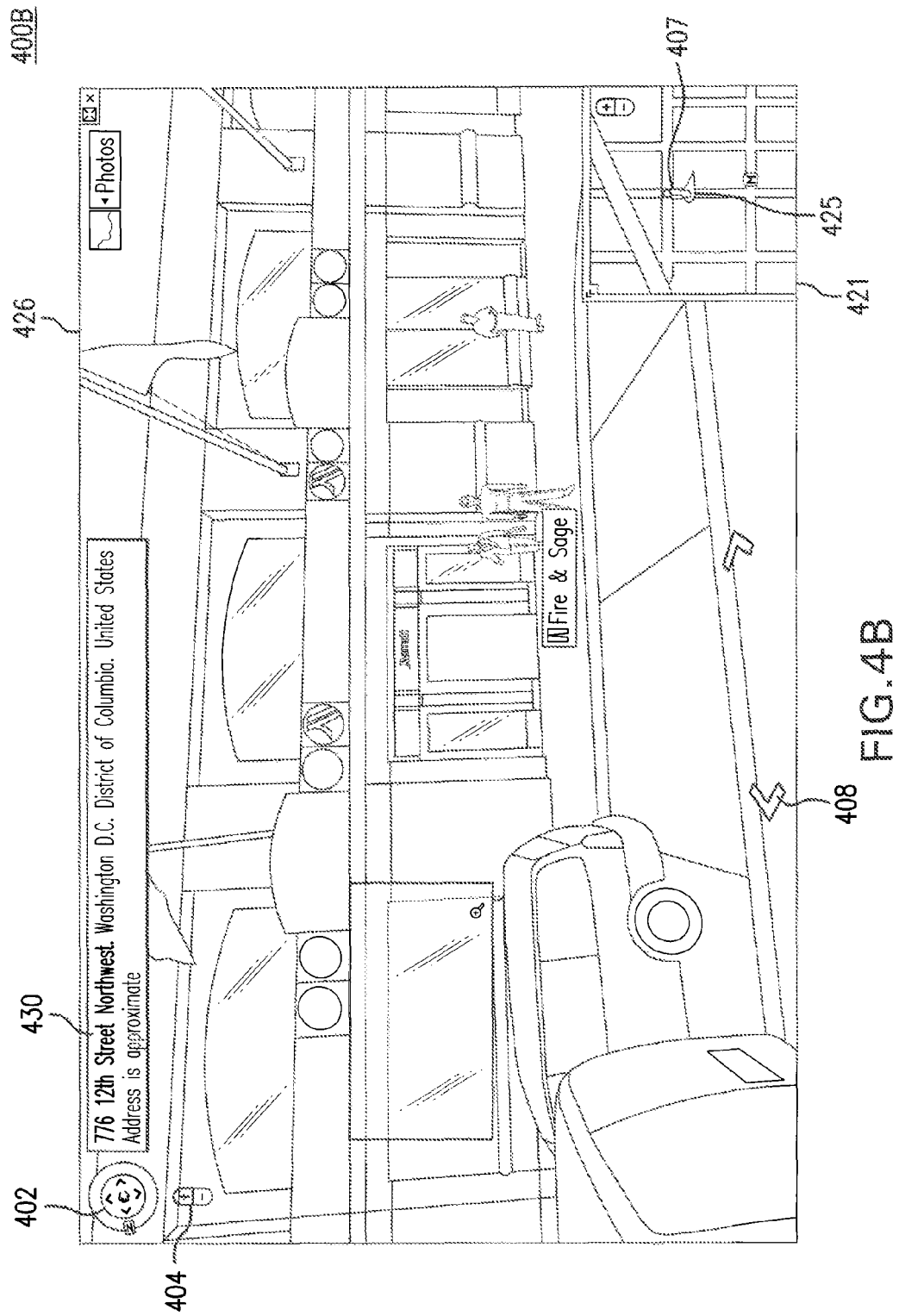
FIG. 4B is an example panoramic interface of a geolocation that can be navigated to by selecting the advertising unit in FIG. 4A, according to one embodiment.

FIG. 4B is an example panoramic interface 400B for a geolocation that can be navigated to by selecting advertising unit 409 in FIG. 4A, according to an embodiment. Panoramic interface 400B includes a number of interface elements from panoramic interface 400A such as compass 402, image scale control 404, pegman 407, and navigation controls 408. Map 421, orientation indicator 425, panoramic image 426, and address indicator 430 correspond to map 401, orientation indicator 405, panoramic image 406, and address indicator 410, respectively, but have been updated based on the new geolocation.

Panoramic image 426 is retrieved using the same process as described for panoramic image 406. In this embodiment, however, panoramic image 426 is retrieved based solely on the geolocation associated with advertising unit 409.

Similarly to panoramic interface 400A, user interface module 105 may add one or more interface elements to panoramic image 426. Additionally, while this example does not include any advertising units, one or more advertising units may also be included.

Orientation indicator 425 has been updated from orientation indicator 405 to reflect the new orientation position of panoramic image 426. Additionally, address indicator 430 has been updated to reflect the new geolocation.

Similarly to panoramic interface 400A, panoramic interface 400B may also include interface controls that allow a user to select points within panoramic image 426 to navigate through neighboring panoramic images. Some or all of the interface elements and controls described herein may be included in one or more embodiments. Additionally, panoramic interface 400B is not intended to limit the embodiments described herein.

Figure 5A:
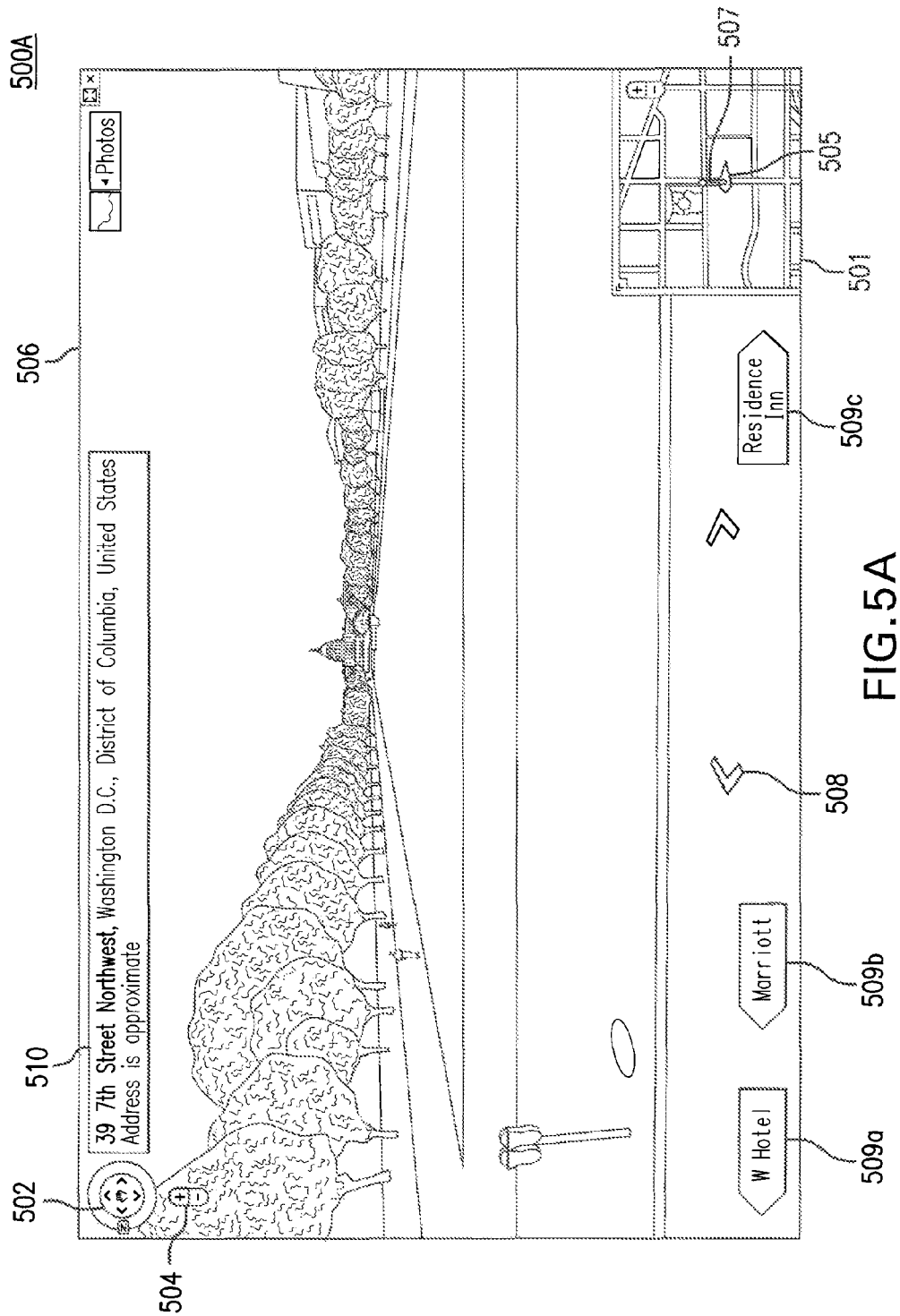
FIG. 5A is an example panoramic interface of a geolocation that includes an image and example advertising units that are placed on the image, according to one embodiment.

FIG. 5A is an example panoramic interface of a geolocation that includes a photographic image and example advertising units that are placed on the image, according to an embodiment. Panoramic interface 500A includes map 501, compass 502, image scale control 504, orientation indicator 505, panoramic image 506, pegman 507, navigation controls 508, advertising units 509a-c, and address indicator 510.

In some embodiments, panoramic image 506 is retrieved from panoramic image database 108 by map-image module 103. Panoramic image 506 may be used to show the image corresponding to the geolocation selected by a user. In this embodiment, panoramic image 506 is retrieved based on the user selecting a geolocation by placing pegman 307 on a geolocation in map 301.

Once advertisings unit 509a-c are selected from advertisement database 106 by advertisement module 102, advertising unit placement module 104 places advertising units 509a-c onto panoramic image 506. Panoramic image 506 is then displayed to a user through user interface module 105 via advertising unit placement module 104. User interface module 105 may then add one or more interface elements to panoramic image 506 such as, for example, map 501, compass 502, scale control 504, orientation indicator 505, pegman 507, navigation controls 508, and address indicator 510.

Compass 502 may be used to either rotate map 501 to an alternate orientation or select a new geolocation. Scale control 504 may be used to change the zoom factor of panoramic image 506. Orientation indicator 505 may be used to indicate the current orientation of panoramic image 506. Pegman 507 may be used to indicate the geolocation on map 501 that corresponds to panoramic image 506. Navigation controls 508 may be used to navigate to a neighboring geolocation whereby an image of the neighboring geolocation will be retrieved and displayed. Address indicator 510 may be used to show the user the address, or an approximate address, of the selected geolocation.

Advertising units 509*a-c* are example advertising units that provide an indication of where an advertiser associated with each advertising unit is generally located. For example, advertising units 509*a* and 509*b* point in one direction while advertising unit 509*c* points in the opposite direction. In some embodiments, advertising units 509*a-c*, as well as other advertising units, may be aligned along the bottom of panoramic image 506.

In this embodiment, advertising unit 509 was retrieved based on the advertiser including, with advertising unit 509, a keyword "hotel" and a geolocation range that encompassed the geolocation selected by the user. The retrieval was also based on the user's profile that included search results for hotels.

In some embodiments, advertising units 509*a-c* may be selected by a user. If selected, the user is directed to an image of the advertiser's geolocation. This may be achieved either by retrieving and displaying a new panoramic image of the advertiser's geolocation or by navigating the user along a path from the panoramic image 506 to a new panoramic image of the advertiser's geolocation.

Panoramic interface 500A may also include interface controls that allow a user to select points within panoramic image 506 to navigate through neighboring panoramic images. If a point within panoramic image 506 is selected, a panoramic image corresponding to the selected point may be displayed with a placed advertising unit. If the user navigates to a neighboring panoramic image, the neighboring image may be displayed with the same or a different advertising unit. Other interface controls may also be provided to assist with navigating through panoramic images.

Some or all of the interface elements and controls described herein may be included in one or more embodiments. Additionally, panoramic interface 500A is not intended to limit the embodiments described herein.

Figure 5B:
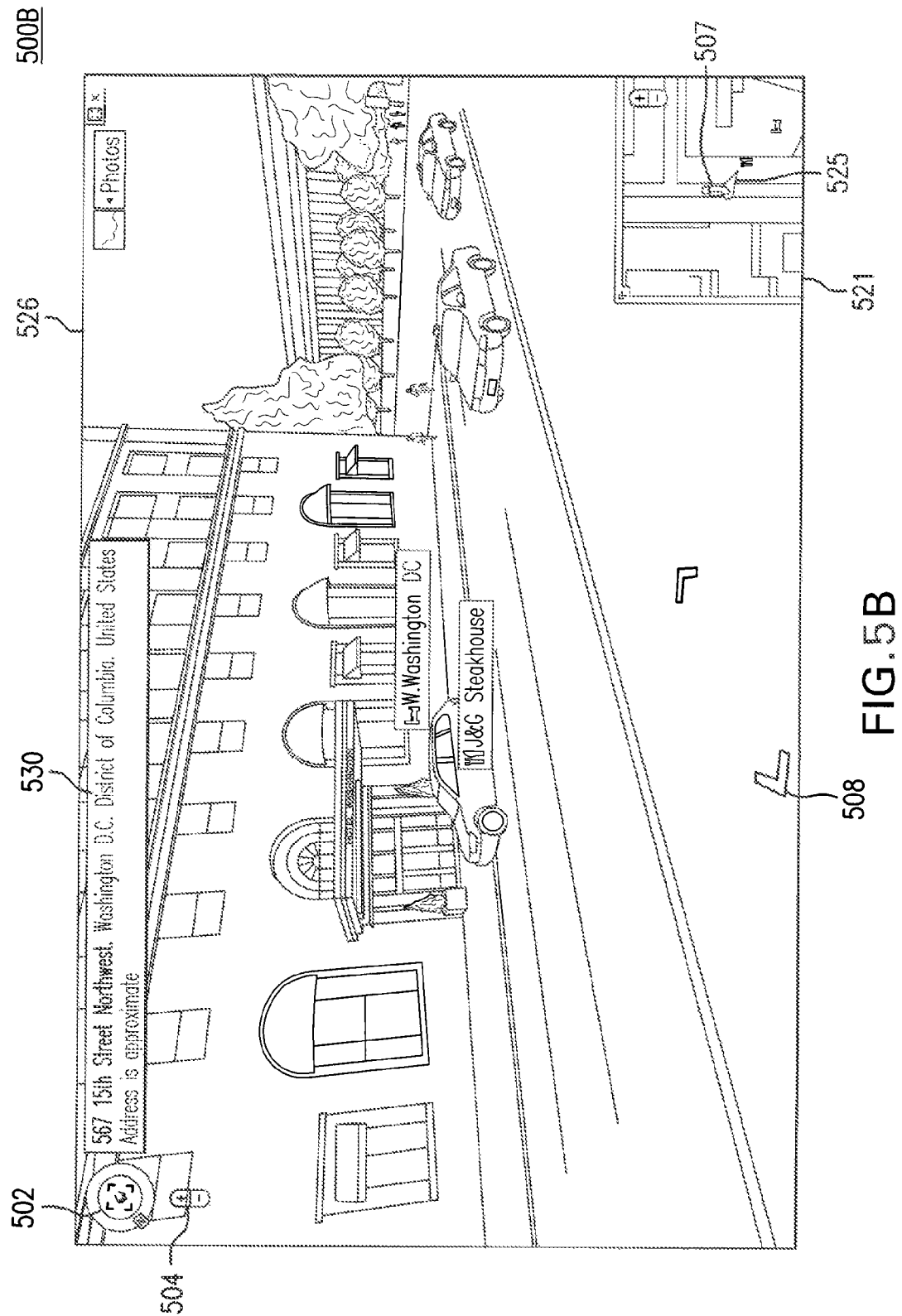
FIG. 5B is an example panoramic interface of a geolocation that can be navigated to by selecting one of the advertising units in FIG. 5A, according to one embodiment.

FIG. 5B is an example panoramic interface 500B for a geolocation that may be navigated to by selecting advertising unit 509*a* in FIG. 5B, according to one embodiment. Panoramic interface 500B includes a number of interface elements from panoramic interface 500A such as compass 502, image scale control 504, pegman 507, and navigation controls 508. Map 521, orientation indicator 525, panoramic image 526, and address indicator 530 correspond to map 501, orientation indicator 505, panoramic image 506, and address indicator 510, respectively, but have been updated based on the new geolocation.

Panoramic image 526 may be retrieved using the same process as described for panoramic image 506. In this embodiment, however, panoramic image 526 is retrieved based solely on the geolocation associated with advertising unit 509*a* that was selected by the user.

Similarly to panoramic interface 500A, user interface module 105 may also add one or more interface elements to panoramic image 526. Additionally, while this example does not include any advertising units, one or more advertising units may also be included.

Orientation indicator 525 has been updated from orientation indicator 505 to reflect the new orientation position of panoramic image 526. Additionally, address indicator 530 has been updated to reflect the new geolocation.

Similarly to panoramic interface 500A, panoramic interface 500B may also include interface controls that allow a user to select points within panoramic image 526 to navigate through neighboring panoramic images. Some or all of the interface elements and controls described herein may be included in one or more embodiments. Additionally, panoramic interface 500B is not intended to limit the embodiments described herein.

Example Computer System

Figure 6:
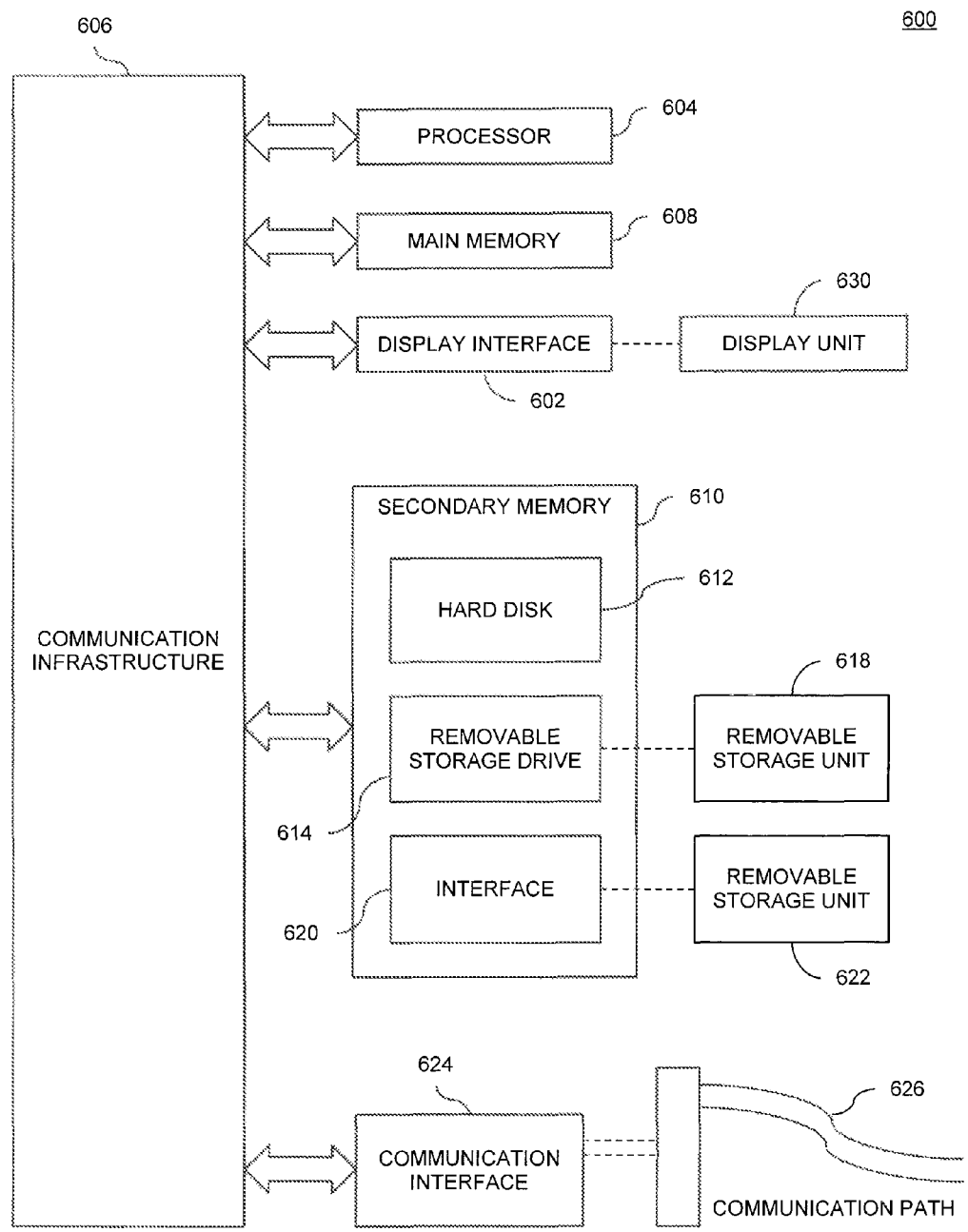
FIG. 6 illustrates an example computer in which embodiments of the present disclosure, or portions thereof, may be implemented.

FIG. 6 illustrates an example computer system 600 in which embodiments of the present disclosure, or portions thereof, may be implemented. For example, map server 101, advertising unit database 106, map database 107, panoramic image database 108, and client device 120 may be implemented in one or more computer systems 600 using hardware, software, firmware, computer readable storage media having instructions stored thereon, or a combination thereof.

One of ordinary skill in the art may appreciate that embodiments of the disclosed subject matter can be practiced with various computer system configurations, including mufti-core multiprocessor systems, minicomputers, mainframe computers, computers linked or clustered with distributed functions, as well as pervasive or miniature computers that may be embedded into virtually any device.

For instance, a computing device having at least one processor device and a memory may be used to implement the above described embodiments. A processor device may be a single processor, a plurality of processors, or combinations thereof. Processor devices may have one or more processor "cores."

Various embodiments are described in terms of this example computer system 600. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

As will be appreciated by persons skilled in the relevant art, processor device 604 may be a single processor in a multi-core/multiprocessor system, such system operating alone, or in a cluster of computing devices operating in a cluster or server farm. Processor device 604 is connected to a communication infrastructure 606, for example, a bus, message queue, network, or multi-core message-passing scheme.

Computer system 600 also includes a main memory 608, for example, random access memory (RAM), and may also include a secondary memory 610. Secondary memory 610 may include, for example, a hard disk drive 612, and removable storage drive 614. Removable storage drive 614 may include a floppy disk drive, a magnetic tape drive, an optical disk drive, a flash memory drive, or the like. The removable storage drive 614 reads from and/or writes to a removable storage unit 618 in a well-known manner. Removable storage unit 618 may include a floppy disk, magnetic tape, optical disk, a flash memory, etc. which is read by and written to by removable storage drive 614. As will be appreciated by persons skilled in the relevant art, removable storage unit 618 includes a computer readable storage medium having stored thereon computer software and/or data.

In alternative implementations, secondary memory 610 may include other similar means for allowing computer programs or other instructions to be loaded into computer system 600. Such means may include, for example, a removable storage unit 622 and an interface 620. Examples of such means may include a program cartridge and cartridge interface (such as that found in video game devices), a removable memory chip (such as an EPROM, or PROM) and associated socket, and other removable storage units 622 and interfaces 620 which allow software and data to be transferred from the removable storage unit 622 to computer system 600.

Computer system 600 may also include a communications interface 624. Communications interface 624 allows software and data to be transferred between computer system 600 and external devices. Communications interface 624 may include a modem, a network interface (such as an Ethernet card), a communications port, a PCMCIA slot and card, or the like. Software and data transferred via communications interface 624 may be in the form of signals, which may be electronic, electromagnetic, optical, or other signals capable of being received by communications interface 624. These signals may be provided to communications interface 624 via a communications path 626. Communications path 626 carries signals and may be implemented using wire or cable, fiber optics, a phone line, a cellular phone link, an RF link or other communications channels.

In this document, the terms "computer storage medium" and "computer readable storage medium" are used to generally refer to media such as removable storage unit 618, removable storage unit 622, and a hard disk installed in hard disk drive 612. Computer storage medium and computer readable storage medium may also refer to memories, such as main memory 608 and secondary memory 610, which may be memory semiconductors (e.g. DRAMs, etc.).

Computer programs (also called computer control logic) are stored in main memory 608 and/or secondary memory 610. Computer programs may also be received via communications interface 624. Such computer programs, when executed, enable computer system 600 to implement the embodiments described herein. In particular, the computer programs, when executed, enable processor device 604 to implement the processes of the embodiments, such as the stages in the methods illustrated by flowchart 200 of FIG. 2, discussed above. Accordingly, such computer programs represent controllers of computer system 600. Where an embodiment is implemented using software, the software may be stored in a computer storage medium and loaded into computer system 600 using removable storage drive 614, interface 620, and hard disk drive 612, or communications interface 624.

Embodiments of the invention also may be directed to computer program products including software stored on any computer readable storage medium. Such software, when executed in one or more data processing device, causes a data processing device(s) to operate as described herein. Examples of computer readable storage mediums include, but are not limited to, primary storage devices (e.g., any type of random access memory) and secondary storage devices (e.g., hard drives, floppy disks, CD ROMS, ZIP disks, tapes, magnetic storage devices, and optical storage devices, MEMS, nanotechnological storage device, etc.).

CONCLUSION

The Summary and Abstract sections may set forth one or more but not all exemplary embodiments as contemplated by the inventor(s), and thus, are not intended to limit the present invention and the appended claims in any way.

The foregoing description of specific embodiments so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments.

What is claimed is:

1. A computer-implemented method for directing a user to an image of an advertiser's geolocation comprising:
    retrieving, by at least one computer processor, a first image associated with a geolocation, wherein the geolocation is based on a user action and the first image is a street-level photographic image;
    displaying, by the at least one computer processor, the first image in an interface that allows the user to navigate through geolocation images;
    retrieving, by the at least one computer processor, at least one advertising unit based on at least the geolocation associated with the first image, wherein each advertising unit includes at least one geolocation associated with an advertiser;
    placing, by the at least one computer processor, the at least one advertising unit at a location on the first image based on one or more objects captured in the first image;
    retrieving, by the at least one computer processor, a second image when a placed advertising unit is selected by the user, wherein the second image is retrieved based on the geolocation associated with the placed advertising unit; and
    placing, by the at least one computer processor, at least one additional advertising unit on the second image.

2. The computer-implemented method of claim 1, further comprising:
    receiving at least one bid from a plurality of advertisers, wherein each bid indicates an amount an advertiser will pay for an advertising unit associated with the advertiser to be placed on the first image.

3. The computer-implemented method of claim 1, wherein retrieving the at least one advertising unit is further based on a profile associated with the user.

4. The computer-implemented method of claim 1, wherein retrieving the at least one advertising unit is further based on one or more searches previously conducted by the user.

5. The computer-implemented method of claim 1, wherein placing the at least one advertising unit further comprises:

organizing the at least one advertising unit based on a category.

6. The computer-implemented method of claim 1, further comprising:
 navigating the user through a series of images captured along a path from the geolocation associated with the first image to the geolocation associated with the second image.

7. A system for directing a user to an image of an advertiser's geolocation comprising:
 a map-image module, implemented on at least one computer processor, configured to:
 retrieve a first image associated with a geolocation, wherein the geolocation is based on a user action and the first image is a street-level photographic image;
 displaying, by the at least one computer processor, the first image in an interface that allows the user to navigate through geolocation images; and
 retrieve a second image when a placed advertising unit is selected by the user, wherein the second image is retrieved based on a geolocation associated with the placed advertising unit;
 an advertising unit module, implemented on the at least one computer processor, configured to retrieve at least one advertising unit based on at least the geolocation associated with the first image, wherein each advertising unit includes at least one geolocation associated with the advertiser; and
 an advertising unit placement module configured to place the at least one advertising unit at a location on the first image based on one or more objects captured in the first image and at least one additional advertising unit on the second image.

8. The system of claim 7, wherein the advertising unit module is further configured to receive at least one bid from a plurality of advertisers, wherein each bid indicates an amount an advertiser will pay for an advertising unit associated with the advertiser to be placed on the first image.

9. The system of claim 7, wherein the advertising unit module is further configured to retrieve the at least one advertising unit is based on a profile created by the user.

10. The system of claim 7, wherein the advertising unit module is further configured to retrieve the at least one advertising unit is based on one or more searches previously conducted by the user.

11. The system of claim 7, wherein the image placement module is further configured to organize the at least one advertising unit based on a category.

12. The system of claim 7, wherein the map-image module is further configured to navigate the user through a series of images captured along a path from the geolocation associated with the first image to the geolocation associated with the second image.

13. An apparatus comprising a non-transitory computer readable storage medium having instructions encoded thereon that, when executed by a computing device, causes the computing device to perform operations comprising:
 retrieving a first image associated with a geolocation, wherein the geolocation is based on a user action and the first image is a street-level photographic image;
 displaying, by the at least one computer processor, the first image in an interface that allows the user to navigate through geolocation images;
 retrieving at least one advertising unit based on at least the geolocation associated with the first image, wherein each advertising unit includes at least one geolocation associated with an advertiser;
 placing the at least one advertising unit on the first image based on one or more objects captured in the first image;
 retrieving a second image when a placed advertising unit is selected by the user, wherein the second image is retrieved based on the geolocation associated with the placed advertising unit; and
 placing at least one additional advertising unit on the second image.

14. The apparatus of claim 13, the apparatus further comprising:
 receiving at least one bid from a plurality of advertisers, wherein each bid indicates an amount an advertiser will pay for an advertising unit associated with the advertiser to be placed on the first image.

15. The apparatus of claim 13, wherein retrieving the at least one advertising unit is further based on a profile created by the user.

16. The apparatus of claim 13, wherein retrieving the at least one advertising unit is further based on one or more searches previously conducted by the user.

17. The apparatus of claim 13, wherein placing the at least one advertising unit further comprises:
 organizing the at least one advertising unit based on a category.

18. The apparatus of claim 13, the apparatus further comprising:
 navigating the user through a series of images captured along a path from the geolocation associated with the first image to the geolocation associated with the second image.

19. A computer-implemented method for directing a user to an image of an advertiser's geolocation comprising:
 providing, by at least one computer processor, a first image associated with a geolocation, wherein the geolocation is based on a user action and the first image is a street-level photographic image;
 providing, by the at least one computer processor, an interface that displays the first image and allows the user to navigate through geolocation images;
 providing, by the at least one computer processor, at least one advertising unit selected from a collection of advertising units based on at least the geolocation associated with the first image, wherein each advertising unit includes at least one geolocation associated with an advertiser;
 placing, by the at least one computer processor, the at least one advertising unit on the first image based on one or more objects captured in the first image;
 providing, by the at least one computer processor, a second image when a placed advertising unit is selected by the user, wherein the second image is retrieved based on the geolocation associated with the placed advertising unit; and
 placing, by the at least one computer processor, at least one additional advertising unit on the second image.

20. A system for directing a user to an image of an advertiser's geolocation comprising:
 an advertising unit placement module, implemented on at least one computer processor, configured to:
 retrieve a first image associated with a geolocation, wherein the geolocation is based on a user action and the first image is a street-level photographic image;
 provide, the first image to an interface that allows the user to navigate through geolocation images;
 retrieve at least one advertising unit based on at least the geolocation associated with the first image, wherein each advertising unit includes at least one geolocation associated with the advertiser;

place the at least one advertising unit on the first image based on one or more objects captured in the image;

retrieve a second image when a placed advertising unit is selected by the user, wherein the second image is retrieved based on a geolocation associated with the placed advertising unit; and place at least one additional advertising unit on the second image.

* * * * *